(12) United States Patent
Turner et al.

(10) Patent No.: US 6,995,674 B2
(45) Date of Patent: Feb. 7, 2006

(54) PACKAGE ASSEMBLY

(75) Inventors: James F. Turner, Farmington Hills, MI (US); Scott D. Best, Troy, MI (US)

(73) Assignee: Saxon, Inc., Ferndale, MI (US)

( * ) Notice: Subject to any disclaimer, the term of this patent is extended or adjusted under 35 U.S.C. 154(b) by 120 days.

(21) Appl. No.: 10/790,514

(22) Filed: Mar. 1, 2004

(65) Prior Publication Data

US 2004/0178109 A1 Sep. 16, 2004

Related U.S. Application Data

(60) Provisional application No. 60/451,188, filed on Feb. 28, 2003.

(51) Int. Cl.
*G08B 13/14* (2006.01)

(52) U.S. Cl. .............. 340/572.8; 235/492; 340/572.1

(58) Field of Classification Search ............... 340/571, 340/572.8; 235/491–492; 223/85–98; 211/13.1; 206/6.1, 278; 264/272.11; 257/679, 787; 156/60
See application file for complete search history.

(56) References Cited

U.S. PATENT DOCUMENTS

| | | | |
|---|---|---|---|
| 2,035,218 A | 3/1936 | Bloom | 229/71 |
| 4,103,444 A | 8/1978 | Jones et al. | 40/124.1 |
| 4,299,041 A | 11/1981 | Wilson | 40/124.1 |
| 4,426,035 A | 1/1984 | Dieckow | 206/526 |
| 4,607,747 A | 8/1986 | Steiner | 206/232 |
| 4,611,262 A | 9/1986 | Galloway et al. | 361/421 |
| 4,865,247 A | 9/1989 | Grabner | 229/92.1 |
| 4,866,865 A | 9/1989 | Yang | 40/455 |
| 5,030,189 A | 7/1991 | Hightower | 493/186 |
| 5,045,040 A | 9/1991 | Vetter | 493/194 |
| 5,245,171 A | 9/1993 | Fox et al. | 235/492 |
| 5,290,225 A | 3/1994 | Younger | 493/188 |
| 5,508,684 A * | 4/1996 | Becker | 340/572.5 |
| 5,896,087 A * | 4/1999 | Frowein | 340/572.1 |
| 5,982,284 A * | 11/1999 | Baldwin et al. | 340/572.8 |
| 5,986,569 A * | 11/1999 | Mish et al. | 340/10.42 |
| 5,995,006 A | 11/1999 | Walsh | 340/572.7 |
| 6,050,622 A * | 4/2000 | Gustafson | 292/307 R |
| 6,173,554 B1 | 1/2001 | Marbler | 53/412 |
| 6,220,516 B1 * | 4/2001 | Tuttle et al. | 235/492 |
| 6,254,953 B1 * | 7/2001 | Elston | 428/40.1 |

(Continued)

OTHER PUBLICATIONS

*RFID A Key to Automating Everything*, by Roy Want, Scientific American, pp. 54-65, Jan. 2004.

*Primary Examiner*—Benjamin C. Lee
*Assistant Examiner*—Hoi C. Lau
(74) *Attorney, Agent, or Firm*—Howard & Howard (57) ABSTRACT

The invention provides a package assembly for an article such as radio frequency identification device. The package assembly defines a pocket for receiving the radio frequency identification device and can be attached to a second article for maintaining the position of the radio frequency identification device with respect to the second article. The package assembly includes a blank having first and second panels that can be folded over one another. A first quantity of adhesive connects the panels to one another after the panels have been folded over. A second quantity of adhesive is disposed disintermediate of the first and second panels to connect the package to the article. The package also includes an access portion connected to one of the panels by a plurality of perforations. A pull tab extends from the access portion to enhance the removal of the access portion with respect to the associated panel.

21 Claims, 7 Drawing Sheets

U.S. PATENT DOCUMENTS

| | | | |
|---|---|---|---|
| 6,433,686 B1 * | 8/2002 | Feibelman | 340/572.8 |
| 6,469,627 B1 | 10/2002 | Forster | 340/572.8 |
| 6,724,311 B1 * | 4/2004 | Kolton et al. | 340/572.8 |
| 2001/0054960 A1 * | 12/2001 | Kolton et al. | 340/572.8 |
| 2002/0036237 A1 | 3/2002 | Atherton et al. | 235/492 |
| 2002/0044058 A1 | 4/2002 | Heinrich et al. | 340/572.1 |
| 2002/0067264 A1 | 6/2002 | Soehnlen | 340/572.1 |
| 2002/0067266 A1 | 6/2002 | Lee et al. | 340/572.7 |
| 2002/0067268 A1 | 6/2002 | Lee et al. | 340/572.7 |
| 2002/0195195 A1 | 12/2002 | Grabau et al. | 156/300 |
| 2003/0016122 A1 | 1/2003 | Petrick | 340/10.41 |
| 2003/0156033 A1 | 8/2003 | Savage et al. | 340/572.8 |
| 2003/0189490 A1 | 10/2003 | Hogerton et al. | 340/572.8 |
| 2003/0197064 A1 | 10/2003 | Saint et al. | 235/492 |
| 2004/0035526 A1 * | 2/2004 | Chamandy et al. | 156/293 |
| 2004/0064362 A1 * | 4/2004 | Rosenfeld | 705/14 |

* cited by examiner

PACKAGE ASSEMBLY

RELATED APPLICATION

This application claims priority to and all the benefits of U.S. Provisional Patent Application, Ser. No. 60/451,188, which was filed on Feb. 28, 2003.

BACKGROUND OF THE INVENTION

1. Field of the Invention

The invention relates to a package for enclosing an article and more particularly the invention provides a package having a pocket for receiving a first article and a quantity of adhesive for connecting the pocket containing the first article to a second article.

2. Description of the Prior Art

Radio frequency identification systems include relatively small tags that can be physically associated with an article. The tag is a small silicone chip that includes a transistor and an integrated circuit. Data corresponding to the article can be stored in the tag's integrated circuit. Radio frequency identification systems also include readers that can communicate with the tags and retrieve the data stored in the tag's integrated circuit. In one example of radio frequency identification technology, tags and readers can be used to assist the purchasers of fine art. For example, a tag can be programmed to include data relating to a particular piece of art such as the artist, the date of creation, the price, and the history of ownership. The tag can be physically connected to the piece of art in an art gallery. A prospective buyer can review the available pieces of art in the gallery and use a hand-held reader to retrieve information about any one particular piece of art.

U.S. Pat. No. 5,986,569 discloses a package for holding a radio frequency identification device. The package includes a front panel and a rear panel forming a pocket for receiving the radio frequency identification device. Adhesive is applied to the outwardly facing surface of the rear panel and a removable liner covers the adhesive until the package is connected to another article such as a product, a box, or some other article.

SUMMARY OF THE INVENTION AND ADVANTAGES

An apparatus for positioning a first article such as a radio frequency identification device with respect to a second article. The apparatus comprises a blank having first and second panels defining respective first and second peripheries (20, 22) and sharing a common folding edge (24) for folding the first and second panels (16, 18) over one another. A first quantity of adhesive (26) is disposed on one of the first and second panels (16, 18) and aligned with one of the first and second peripheries (20, 22) for connecting the first and second panels (16, 18) and forming a substantially closed pocket (28) between the first and second panels (16, 18) after folding for encapsulating the first article. A first plurality of perforations (30) extend through one of the first and second panels (16, 18) along a path (48) to define an access portion (32) for opening the substantially closed pocket (28). A pull tab (34) extends from the access portion (32) for tearing of the access portion (32) from the one of the first and second panels (16, 18) and opening the substantially closed pocket (28) for exposing the first article. The apparatus (10) is characterized by a second quantity of adhesive (36) disposed on one of the first and second panels (16, 18) and being disintermediate relative to the first and second panels (16, 18) when the first and second panels (16, 18) are folded over one another such that the second quantity of adhesive (36) can be substantially exposed for connecting the blank (14) to the second article.

The subject invention therefore provides a useful package assembly for attaching a first article to a second article. The package assembly permits the first article to be easily removed when desired. Also, after the first article is removed, the package assembly can be left on the second article.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring now to FIGS. 1–4, the present invention provides an apparatus 10 or packaging assembly 10 for positioning a first article, such as a radio frequency identification device 12, with respect to a second article (not shown). The first article can be an electronic device, a document, or a memory storage device. The second article can be any article of manufacture, including packaging such as a pallet or a box, consumer goods such as electronic equipment or clothing, or relatively expensive goods such as automobiles or pieces of fine art. Generally, the first and second articles are related in that the first article embodies information corresponding to the second article.

The apparatus 10 is an exemplary embodiment of the invention and includes a blank 14 having first and second panels 16, 18 defining respective first and second peripheries 20, 22. The first and second peripheries 20, 22 share a common folding edge 24. The first and second panel 16, 18 can be folded over one another along a folding edge 24. The folding edge 24 as illustrated in the drawing figures is merely for descriptive purposes and does not represent a cut of the blank 14.

In a preferred embodiment of the invention, the first and second panels 16, 18 of the blank 14 are each covered by a layer of adhesive 38. A release liner 58 covers the layer of adhesive 38. The layer of adhesive 38 and the release liner 58 will be described in greater detail below. Preferably, the first and second panels 16, 18 are formed of a card stock.

Hence, the preferred embodiment includes a continuous sheet of card stock, adhesive, and release liner. It should be appreciated that the first and second panels 16, 18 can be formed from pulp boards treated with resin, known as pasteboard, web sheet or card stock.

The layer of adhesive 38 includes a first quantity of adhesive 26 disposed on one of the first and second panels 16, 18. The first quantity of adhesive 26 is aligned with one of the first and second peripheries 20, 22. When the first and second panel 16, 18 are folded over one another, the first quantity of adhesive 26 connects the first and second panel 16, 18 with respect to one another, forming a substantially closed pocket 28 between the first and second panel 16, 18.

The layer of adhesive 38 also includes a second quantity of adhesive 36 disposed on one of the first and second panels 16, 18. In the exemplary embodiment, the second quantity of adhesive 36 is disposed on the first panel 16. The second quantity of adhesive 36 is disintermediate relative to the first and second panel 16, 18 where the first and second panel 16, 18 are folded over one another. In other words, the second quantity of adhesive 36 is disposed on an outwardly facing surface of the apparatus 10 when the first and second panels 16, 18 are folded over one another and connected with the first quantity of adhesive 26, best shown in FIG. 4. The second quantity of adhesive 36 connects the pocket 28 to the second article. FIG. 1A shows the first quantity of adhesive 26 distinguished from the second quantity of adhesive 36 by a boundary 74. The boundary 74 corresponds to the periphery 22 of the second panel 16.

Referring now to FIGS. 1 and 3–6, the preferred embodiment includes the first and second quantities of adhesive 26, 36 being disposed on the first panel 16. In addition, the first quantity of adhesive 26 is also disposed on the second panel 18. Hence, the layer of adhesive 38 covers both inwardly facing surfaces 40, 42 of the panels 16, 18. However, the invention could be practiced wherein only the first panel 16 is covered with adhesive. Further, the first and second quantities of adhesive 26, 36 could be disposed on opposite panels 16, 18. The type of adhesive selected for one or both of the first and second quantities 26, 36 can be one of, or a combination of, pressure sensitive adhesive, liquid, paste, powder, and dry film. The adhesive is preferably the pressure sensitive adhesive covered by the release liner 58 Alternatively, the adhesive can be moisture activated such as the adhesive covering the flap of an envelope.

Figure 1:
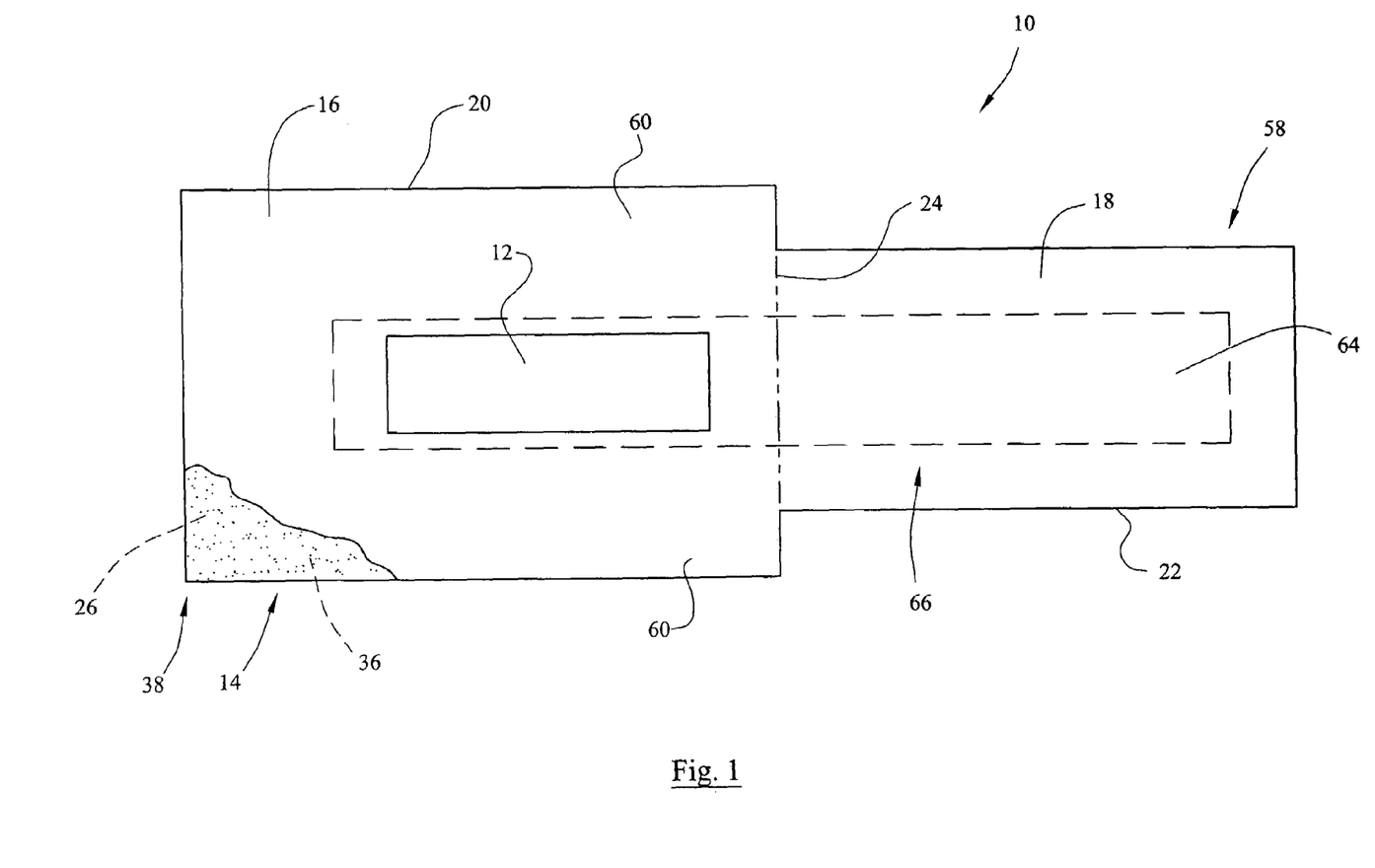
FIG. 1 is a top view of a blank according to an exemplary embodiment of the invention.
Figure 1A:
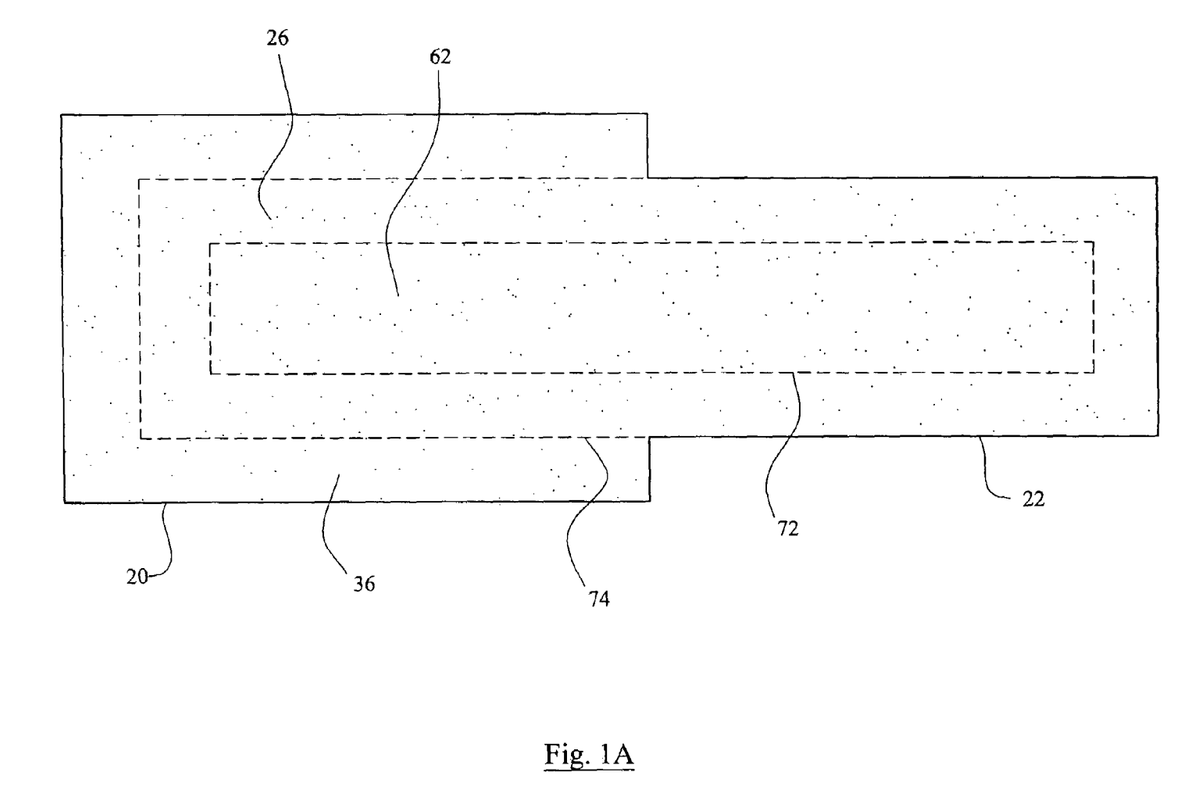
FIG. 1A is a top view of the blank with a liner being removed to expose a layer of adhesive.
Figure 2:
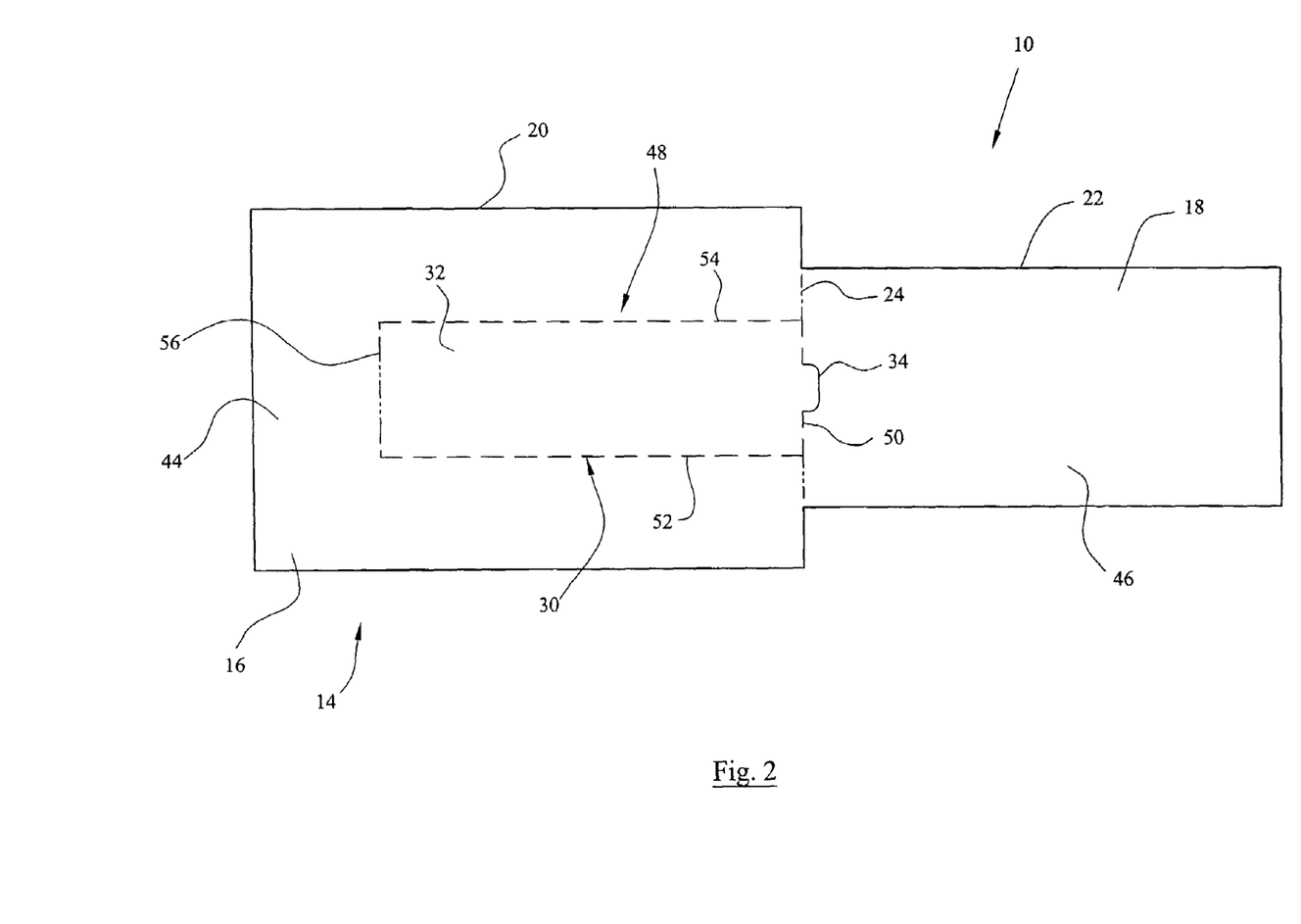
FIG. 2 is a bottom view of the blank.
Figure 3:
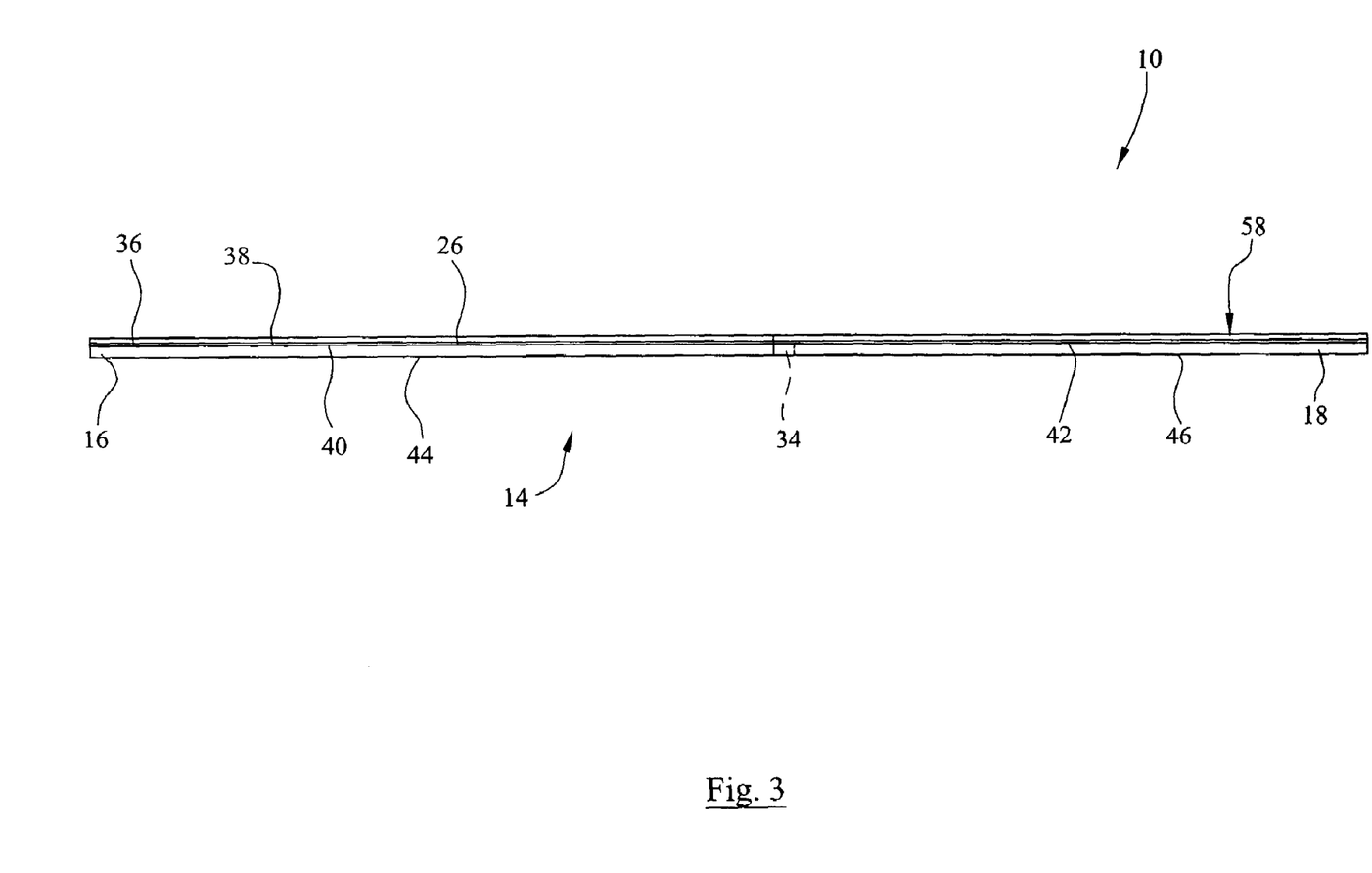
FIG. 3 is a side view of the blank.

Referring now to FIGS. 1–3, the first panel 16 is wider than the second panel 18. The portion of the first panel 16 that extends past the periphery 22 of the second panel 18 supports the second quantity of adhesive 36. In an alternative embodiment of the invention, both the panels 16, 18 could be the same size and the second quantity of adhesive 36 could be disposed on one of the outwardly facing surfaces 44, 46 of the panel 16, 18, respectively. In both the illustrated embodiment and the proposed embodiment, the access portion 32 is exposed when the apparatus 10 is connected to the second article.

The apparatus 10 also includes a first plurality of perforations 30 extending through one of the first and second panels 16, 18. In the exemplary embodiment, the perforations 30 extend through the first panel 16. In manufacturing the preferred embodiment of the apparatus 10, the die stroke that forms the first plurality of perforations 30 can also form perforations in the release liner 58, as discussed more fully below. The perforations 30 extend along a path 48 to define an access portion 32. The access portion 32 can be torn from the first panel 16 to open the substantially closed pocket 28.

A pull tab 34 extends from the access portion 32 to enhance the tearing of the access portion 32 and opening of the pocket 28.

Referring now to FIG. 2, the path 48 is defined by the first plurality of perforations 30 and includes a first edge 50 coaxial with respect to the folding edge 24. The path 48 also includes a second edge 52 extending from the folding edge 24. The path 48 also includes a third edge 54 extending from the folding edge 24 and spaced from second edge 52. The first plurality of perforations 30 define three sides of the access portion 32. A fourth side of the access portion 32 is defined by a second folding edge 56 that extends between respective ends of the second and third edges 52, 54 of the path 30 and also extends between the first panel 16 and the access portion 32. The second folding edge 56 as illustrated in the drawing figures does not represent a cut of the blank 14. Generally, the path 30 is configured, and the access portion 32 is sized, to allow the removal of the radio frequency identification device 12 when the access portion 32 is torn from the first panel 16. In alternative embodiments of the invention cited in the claims, the path 30 and the access portion 32 could be spaced from the folding edge 24, or the path 30 and the access portion 32 could be defined by the second panel 18, or the second folding line 56 could be replaced with additional perforations to allow for the complete removal of the access portion 32 with respect to the first panel 16.

In the exemplary embodiment of the invention, the pull tab 34 extends from the access portion 32 at the folding edge 24 and defines a breach or split in the folding edge 24. The pull tab 34 is stamped or die cut with respect to the second panel 18. As a result, the pull tab 34 can maintain a substantially aligned orientation with respect to the access portion 32 when the first and second panel 16, 18 are folded over one another. In other words, when the first and second panels 16, 18 are folded over one another, the pull tab 34 will appear cantilevered from the access portion 32, best shown in FIG. 4.

The release liner 58 includes a first liner portion 60 covering the first and second quantities of adhesive 26, 36. The layer of adhesive 38 further also includes a third quantity of adhesive 62 and the release liner 58 includes a second liner portion 64 covering the third quantity of adhesive 62. The third quantity of adhesive 62 is surrounded by the first quantity of adhesive 26. The first and second liner portions 60, 64 are removably associated with one another. For example, a second plurality 66 of perforations can be disposed between the first and second liner portion 60, 64. The second plurality 66 of perforations can be aligned with at least a portion of the first plurality of perforation 30. The first, second and third quantities of adhesive 26, 36, 62 are preferably the same type of adhesive, but can be different. FIG. 1A shows the third quantity of adhesive 62 distinguished from the first quantity of adhesive 26 by a boundary 72.

Figure 4:
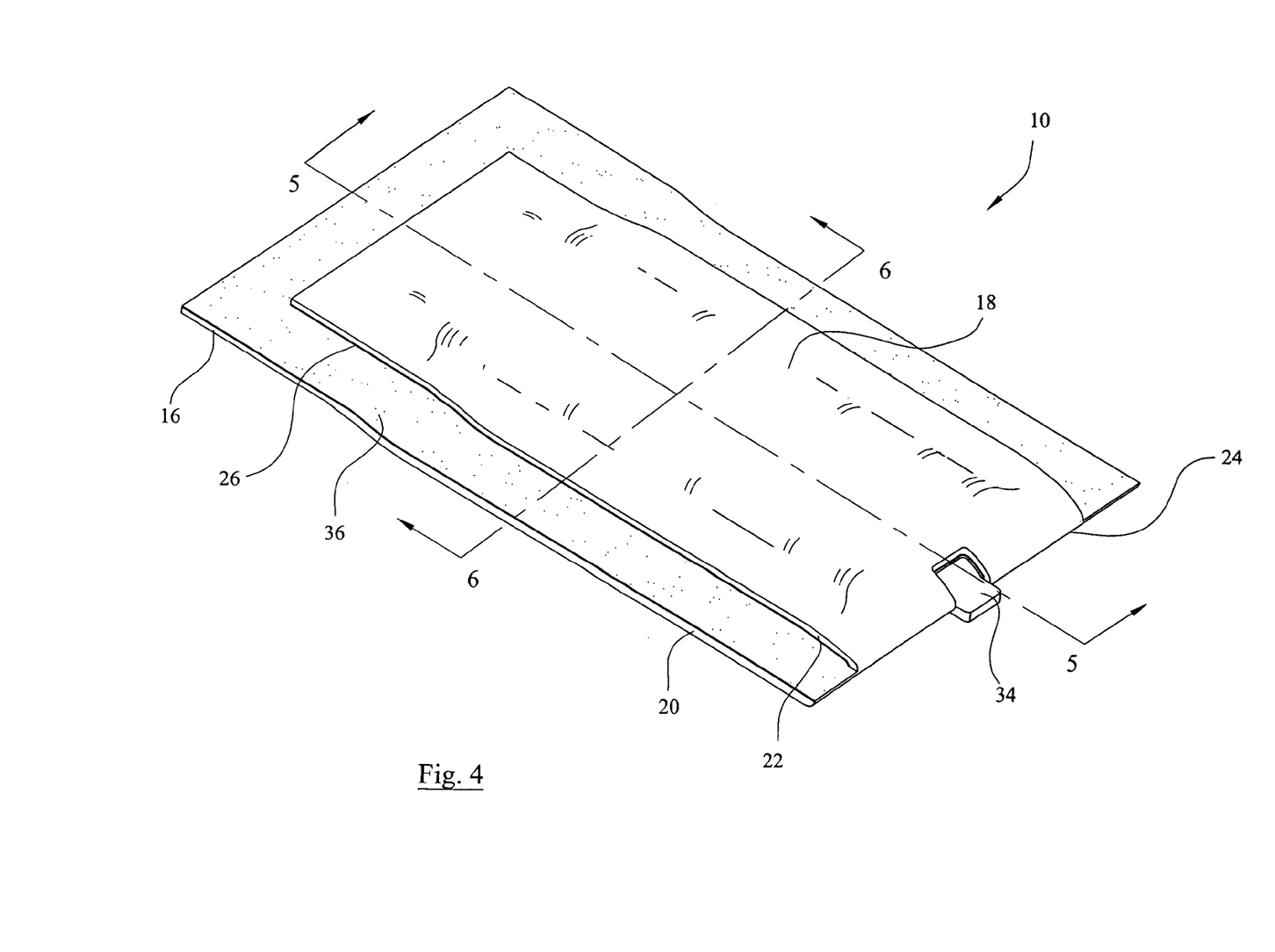
FIG. 4 is a perspective view of the blank when first and second panels of the blank are folded over to enclose an article.
Figure 5:
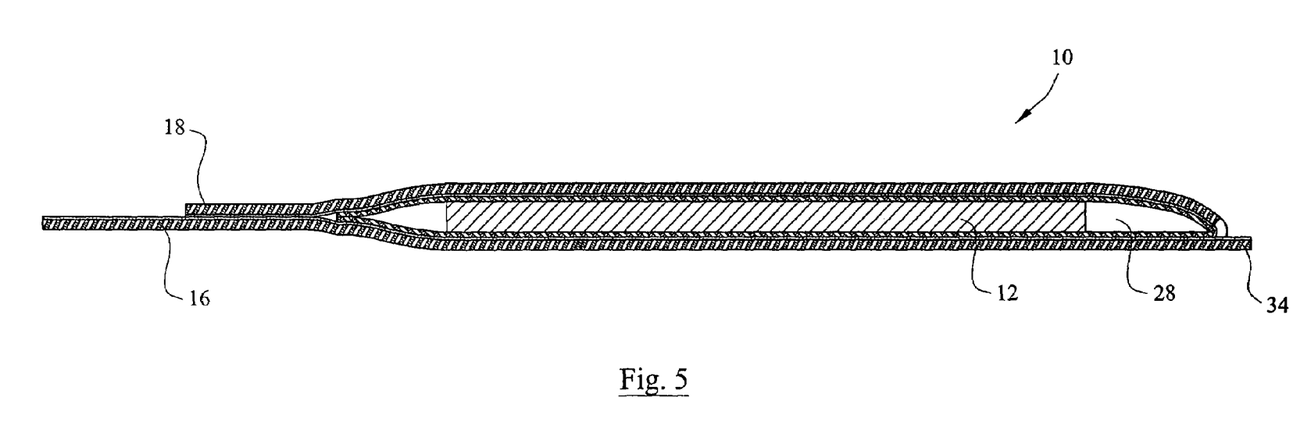
FIG. 5 is a longitudinal cross-sectional view taken along section line 5—5 of FIG. 4.
Figure 6:
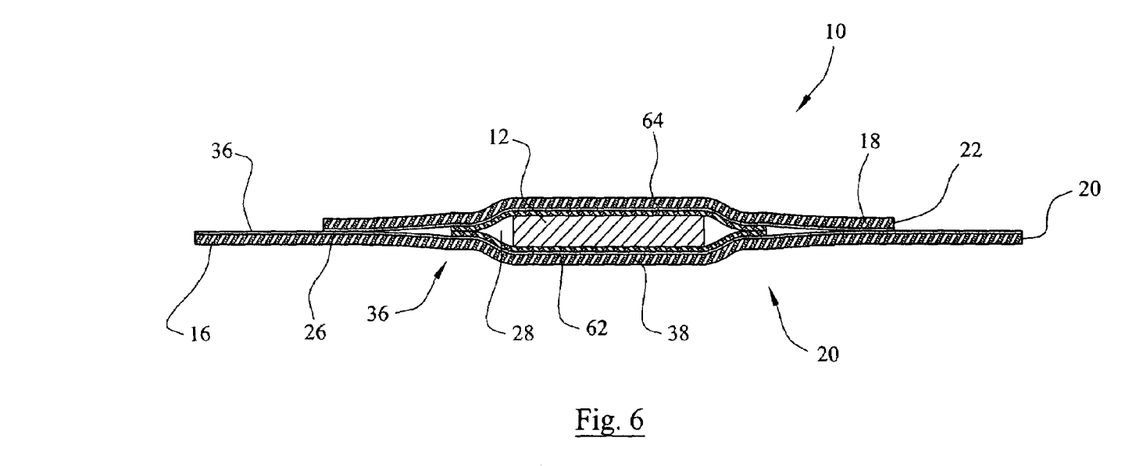
FIG. 6 is a transverse cross-sectional view taken along section line 6—6 shown in FIG. 4.

Referring now to FIGS. 1–8, in operation, the apparatus 10 can position the radio frequency identification device 12 with respect to the second article. In an illustrative method according to the invention for securing the radio frequency identification device 12, the radio frequency identification device 12 is positioned on the second liner portion 64 above the first panel 16. Next, the first liner portion 60 of the release liner 58 can be removed with respect to the blank 14, exposing the first and second quantities of adhesive 26, 36. The second liner portion 64 is maintained in place, covering the third quantity of adhesive 62. The first and second panels 16, 18 are then folded over one another along the folding edge 24. As best seen in FIG. 4, after the panels 16, 18 are folded over one another, the radio frequency identification device 12 is encapsulated. Also, the second quantity of adhesive 36 is exposed such that the apparatus 10 can be connected to the second article. The first quantity of adhesive 26 substantially fixedly connect the first and second panels 16, 18 with respect to one another. The second liner portion 64 forms an inner surface of the pocket 28, insulating the radio frequency identification device 12 from the third quantity of adhesive 62.

Figure 7:
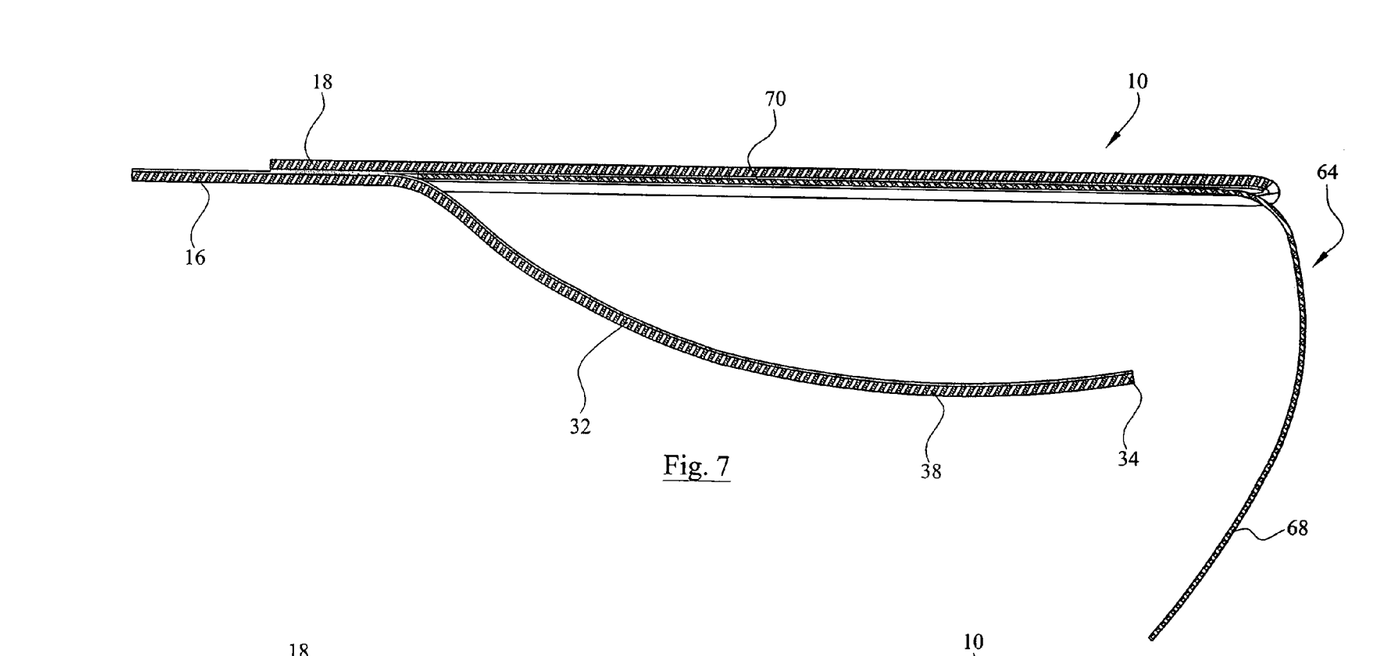
FIG. 7 is a longitudinal cross-sectional view similar to the view of FIG. 5 illustrating the removal of the article.
Figure 8:
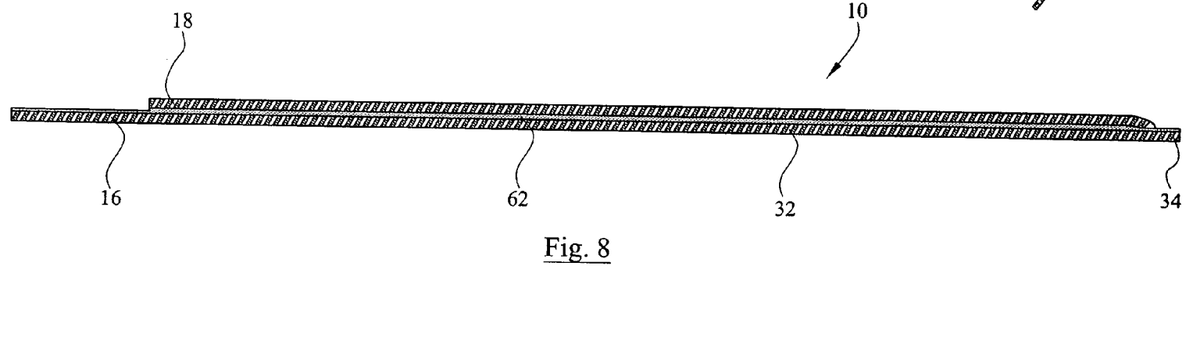
FIG. 8 is a longitudinal cross-sectional view similar to FIG. 5 with the article out and the liner removed.

When it is desired to remove the radio frequency identification device 12 from the article, the pull tab 34 can be grasped and pulled outwardly away from the second article and the access portion 32 can be torn from the first panel 16 along the edges 50, 52, 54 for opening the closed pocket 28 and exposing the radio frequency identification device 12. FIG. 7 shows the access portion 32 torn from the first panel 16 and the radio frequency identification device 12 has been removed. The access portion 32 is folded over the second folding edge 56 and a portion 68 of the second liner portion 64 becomes disassociated with respect to the access portion 32 and the radio frequency identification device 12 is removed. Next, a second portion 70 of the second liner portion 64 is removed from the second panel 18. In a last step, best seen in FIG. 8, the access portion 32 is pressed against the second panel 18 and substantially fixedly connected to the panel 18 by the third quantity of adhesive 62. As a result, after the radio frequency identification device 12 is removed from the apparatus 10, the apparatus 10 can assume a substantially flat and shallow configuration.

In another embodiment of the invention, an outwardly facing surface of the apparatus 10 can include indicia such as a logo or trademark. The indicia can be printed material or it can be an embossed portion of one of the panels 16, 18. The indicia can be disposed on the access portion 32 or an outwardly facing surface surrounding the access portion 32. Further, the apparatus 10 could pass through a variable printer, such as a thermotransfer printer, for printing variable information on the apparatus 10. The variable information could be any suitable numerical sequence, bar code, or other such information.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus (10) for positioning a first article which comprises a radio frequency identification device (12) with respect to a second article comprising:
   a blank (14) having first and second panels (16, 18) defining respective first and second peripheries (20, 22) and sharing a common folding edge (24) for folding said first and second panels (16, 18) over one another;
   a first quantity of adhesive (26) disposed on one of said first and second panels (16, 18) and aligned with one of said first and second peripheries (20, 22) for connecting said first and second panels (16, 18) and forming a substantially closed pocket (28) between said first and second panels (16, 18) after folding for encapsulating the first article;
   a first plurality of perforations (30) extending through one of said first and second panels (16, 18) along a path (48) to define an access portion (32) for opening the substantially closed pocket (28); and
   a pull tab (34) extending from said access portion (32) for tearing of said access portion (32) from said one of said first and second panels (16, 18) and opening the substantially closed pocket (28) for exposing the first article;
   said apparatus (10) characterized by a second quantity of adhesive (36) disposed on one of said first and second panels (16, 18) and being disintermediate relative to said first and second panels (16, 18) when said first and second panels (16, 18) are folded over one another such that said second quantity of adhesive (36) can be substantially exposed for connecting said blank (14) to the second article.

2. The apparatus (10) of claim 1 wherein said first quantity of adhesive (26) and said second quantity of adhesive (36) are both disposed on said first panel (16).

3. The apparatus (10) of claim 2 wherein said first quantity of adhesive (26) is disposed on said second panel (18).

4. The apparatus (10) of claim 1 including a release liner (58) covering one of said first quantity of adhesive (26) and said second quantity of adhesive (36).

5. The apparatus (10) of claim 4 wherein said release liner (58) is further defined as covering both of said first and second quantities of adhesive (26, 36).

6. The apparatus (10) of claim 4 including a third quantity of adhesive (62) surrounded by said first quantity of adhesive (26) and covered by said release liner (58).

7. The apparatus (10) of claim 6 wherein said release liner (58) is further defined as including a first liner portion (60) covering said first and second quantities of adhesive (26, 36) and a second liner portion (64) covering said third quantity of adhesive (62).

8. The apparatus (10) of claim 7 wherein said first and second liner portions (60, 64) are further defined as being removably associated with one another such that said first liner portion (60) is removed to expose said first and second quantities of adhesive (26, 36) while said second liner portion (64) remains covering said third quantity of adhesive (62) to define an inner surface of the substantially closed pocket (28).

9. The apparatus (10) of claim 8 including a second plurality of perforations (66) disposed between said first and second liner portions (60, 64).

10. The apparatus (10) of claim 9 wherein at least a portion of said second plurality of perforations (66) is aligned with a portion of said first plurality of perforations (30).

11. The apparatus (10) of claim 7 wherein one of said first and second liner portions (60, 64) is further defined as surrounding the other of said first and second liner portions (60, 64).

12. The apparatus (10) of claim 1 wherein said first panel (16) is further defined as being wider than said second panel (18).

13. The apparatus (10) of claim 12 wherein said second periphery (22) of said second panel (18) defines a boundary (74) between said first quantity of adhesive (26) and said second quantity of adhesive (36).

14. The apparatus (10) of claim 1 wherein said path (48) is further defined as extending from said folding edge (24).

15. The apparatus (10) of claim 1 wherein said pull tab (34) is further defined as extending from an edge of said access portion (32) coaxial with respect to said folding edge (24).

16. An apparatus (10) for positioning a first article which comprises a radio frequency identification device (12) with respect to a second article comprising:
- a blank (14) having first and second panels (16, 18) defining respective first and second peripheries (20, 22) and sharing a common folding edge (24) for folding said first and panels (16, 18) over one another, wherein said first panel (16) is wider than said second panel (18);
- a first quantity of adhesive (26) disposed along one of said first and second panels (16, 18) and aligned with said second periphery (22) for connecting said first and second panels (16, 18) and forming a substantially closed pocket (28) between said first and second panels (16, 18) after folding for encapsulating the first article;
- a first plurality of perforations (30) extending through said first panel (16) along a path (48) to define an access portion (32) for opening the substantially closed pocket (28);
- a pull tab (34) extending from said access portion (32) for tearing of said access portion (32) from said first panel (16) and opening the substantially closed pocket (28) for exposing the first article; and
- a second quantity of adhesive (36) disposed on said first panel (16) and being disintermediate relative to said first and second panels (16, 18) when said first and second panels (16, 18) are folded over one another with said second quantity of adhesive (36) being disposed on said first panel (16) outside of said second periphery (22) of said second panel (18) when said first and second panels (16, 18) are folded over one another such that said second quantity of adhesive (36) is exposed for connecting said blank (14) to the second article.

17. The apparatus (10) of claim 16 including a third quantity of adhesive (62) surrounded by said first quantity of adhesive (26) and a release liner (58) having a first liner portion (60) covering said first quantity of adhesive (26) and a second liner portion (64) covering said third quantity of adhesive (62) wherein a second plurality of perforations (66) extend between said first and second liner portions (60, 64).

18. The apparatus (10) of claim 17 wherein said second liner portion (64) defines an interior surface of the substantially closed pocket (28) when said first and second panels (16, 18) are folded over one another.

19. The apparatus (10) of claim 16 wherein said path (48) is further defined as having a first edge (50) coaxial with said folding edge (24) and a second edge (52) extending from said folding edge (24) and third edge (54) extending from said folding edge (24) and spaced from said second edge (52).

20. The apparatus (10) of claim 19 including a second folding edge (56) extending between respective ends of said second and third edges (52, 54) of said path (48) and between said access portion (32) said first panel (16).

21. The apparatus (10) of claim 16 wherein said pull tab (34) is further defined as extending from said folding edge (24) away from said first panel.

* * * * *